United States Patent
Kirkpatrick et al.

(10) Patent No.: US 6,288,813 B1
(45) Date of Patent: Sep. 11, 2001

(54) APPARATUS AND METHOD FOR EFFECTING DATA TRANSFER BETWEEN DATA SYSTEMS

(75) Inventors: Joey V. Kirkpatrick, Diamondhead, MS (US); Francis B. Grosz, Jr., Chalmette, LA (US); Kenny Lannes, New Orleans, LA (US); David G. Maniscalco, Arabi, LA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/047,788

(22) Filed: Mar. 25, 1998

(51) Int. Cl.[7] .................................................. H04B 10/00
(52) U.S. Cl. ........................ 359/152; 359/153; 359/110; 359/161
(58) Field of Search .................................. 359/152, 153, 359/110, 161

(56) References Cited

U.S. PATENT DOCUMENTS

| | | | |
|---|---|---|---|
| 4,527,270 | * 7/1985 | Sweeton | 371/11 |
| 4,996,683 | 2/1991 | Yamashita et al. | 370/4 |
| 5,039,194 | 8/1991 | Block et al. | 383/88 |
| 5,093,843 | * 3/1992 | Hirosaki et al. | 375/18 |
| 5,099,349 | * 3/1992 | Yoshida et al. | 359/161 |
| 5,226,431 | 7/1993 | Bible et al. | 128/904 |
| 5,272,558 | 12/1993 | Canestri et al. | 359/173 |
| 5,327,275 | * 7/1994 | Yamane et al. | 359/117 |
| 5,343,319 | * 8/1994 | Moore | 359/152 |
| 5,432,874 | 7/1995 | Muraguchi | 385/24 |
| 5,448,390 | * 9/1995 | Tsuchiya et al. | 359/132 |
| 5,448,661 | 9/1995 | Takai et al. | 385/24 |
| 5,455,703 | 10/1995 | Duncan et al. | 359/152 |
| 5,528,409 | * 6/1996 | Cucci et al. | 359/171 |
| 5,568,576 | 10/1996 | Takai et al. | 385/24 |
| 5,579,336 | 11/1996 | Fitzgerald et al. | 375/219 |
| 5,777,761 | * 7/1998 | Fee | 359/110 |
| 5,790,286 | * 8/1998 | Bae | 359/110 |
| 5,926,303 | * 7/1999 | Giebel et al. | 359/163 |
| 5,949,563 | * 9/1999 | Takada et al. | 359/124 |
| 5,956,168 | * 9/1999 | Levinson et al. | 359/152 |
| 6,025,945 | * 2/2000 | Nyu et al. | 359/152 |
| 6,141,128 | * 10/2000 | Korevaar et al. | 359/152 |

* cited by examiner

Primary Examiner—Leslie Pascal
Assistant Examiner—Hanh Phan
(74) Attorney, Agent, or Firm—Diana M. Cox; Beth A. Vrioni

(57) ABSTRACT

An apparatus for effecting data transfer between data systems comprising a first transceiver and a second transceiver. The first transceiver has an input for receiving digital data from one of the data systems, an output for serially outputting digital data to the one of the data systems, at least one transmitter for converting digital data received at the input into optical signals, and at least one receiver for receiving optical signals and serially converting the received optical signals to digital data for output to the data output. The second transceiver has an input for receiving digital data from another one of the data systems, an output for serially outputting digital data to the another one of the data systems, at least one transmitter for serially converting digital data received at the input of the second transceiver into optical signals, and at least one receiver for receiving optical signals and serially converting the received optical signals to digital data for output to the output of the second transceiver. The apparatus further comprises an optical link connecting the first and second transceivers. The optical link comprising a pair of optical fibers. One of the optical fibers optically links the transmitter of the first transceiver to the receiver of the second transceiver. The other optical fiber optically links the receiver of the first transceiver to the transmitter of the second transceiver.

15 Claims, 5 Drawing Sheets

APPARATUS AND METHOD FOR EFFECTING DATA TRANSFER BETWEEN DATA SYSTEMS

ORIGIN OF THE INVENTION

The invention described herein was made in the performance of work under a NASA contract and is subject to the provisions of Public Law 96-517 (35 USC 202) in which the contractor has elected not to retain title.

BACKGROUND OF THE INVENTION

1. Field of the Invention

The present invention is generally related to an apparatus and method for effecting data transfer between data systems.

2. Problem to be Solved

It is often desirable to transmit digital data between electronic data systems Typically, cables are used for this purpose. However, relatively long distances between electronic data systems often causing delay, attenuation, skewing and distortion of the data signals. Data signals that are delayed, time skewed or distorted can cause degradation in system performance.

One example of the necessity for the transmission of high speed digital data signals between systems located in different locations is the recordation of data pertaining to rocket engine tests. However, due to the relatively large distance separating the data acquisition system, typically comprising probes and/or other types of monitors located in proximity to the rocket engine, and a data analysis and storage system, typically located at a safe, remote location, transmission and reception of quality, high speed digital data signals is not possible.

Any high speed digital signals transmitted over cables linking the data signal acquisition system and the data signal analysis system are subject to time delay, attenuation, skewing, and distortion.

One attempt at solving the aforementioned problem is to provide a system for recording rocket engine test data that is located in relatively close proximity to the rocket engine under test. However, such a set-up creates a substantial risk that the data recording equipment could be destroyed if the rocket engine misfires or explodes. Furthermore, the proximity of the recording system to the rocket engine creates a substantial risk of injury to test and engineering personnel that must retrieve, maintain or repair the recording equipment.

Another attempt at solving the aforementioned problem is to record rocket test data in analog format at a remote location. This set-up uses test probes and/or other types of monitors located in close proximity to the rocket under test, a data recording system located at a remote location, and an amplifier and twisted cable pair for every channel of high speed data. Such a configuration is expensive due to the plurality of amplifiers needed. Furthermore, long runs of the twisted cable can introduce noise into the data signals thereby degrading the quality of the frequency and amplitude components of the data signals. Additionally, the analog data signals must be digitized post-test thereby significantly increasing the data processing time and the test turn-around time.

What is needed is a system and method for effecting transfer of quality data signals between data systems that are at different locations.

It is therefore an object of the present invention to provide a new and improved apparatus and method for transferring data between data systems separated by a relatively large distance.

It is another object of the present invention to provide a new and improved apparatus and method for transferring data between data systems separated by a relatively large distance and wherein the data is in digital format before and after transfer of the data.

It is a further object of the present invention to provide a new and improved apparatus and method for transferring data with a relatively high degree of accuracy between data systems separated by a relatively large distance.

It is yet another object of the present invention to provide a new and improved apparatus and method for transferring data between data systems separated by a relatively large distance that may be implemented cost effectively.

Still other objects and advantages of the present invention will in part be obvious and will in part be apparent from the specification.

SUMMARY OF THE INVENTION

The above and other objects and advantages, which will be apparent to one of skill in the art, are achieved in the present invention which is directed to an apparatus for effecting data transfer between data systems comprising a first transceiver and a second transceiver. The first transceiver has an input for receiving digital data from one of the data systems, an output for serially outputting digital data to the one of the data systems, at least one transmitter for converting digital data received at the input into optical signals, and at least one receiver for receiving optical signals and converting the received optical signals to digital data for output to the first transceiver output. The second transceiver has an input for receiving digital data from another one of the data systems, an output for serially outputting digital data to the another one of the data systems, at least one transmitter for serially converting digital data received at the input of the second transceiver into optical signals, and at least one receiver for serially receiving optical signals and converting the received optical signals to digital data for output to the data output of the second transceiver. The apparatus further comprises an optical link connecting the first and second transceivers. The optical link comprises a pair of optical fibers. One of the optical fibers optically links the transmitter of the first transceiver to the receiver of the second transceiver. The other optical fiber optically links the receiver of the first transceiver to the transmitter of the second transceiver.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

In describing the preferred embodiments of the present invention, reference will be made herein to FIGS. 1–6 of the drawings in which like numerals refer to like features of the invention.

1. The Overall System

Figure 1:
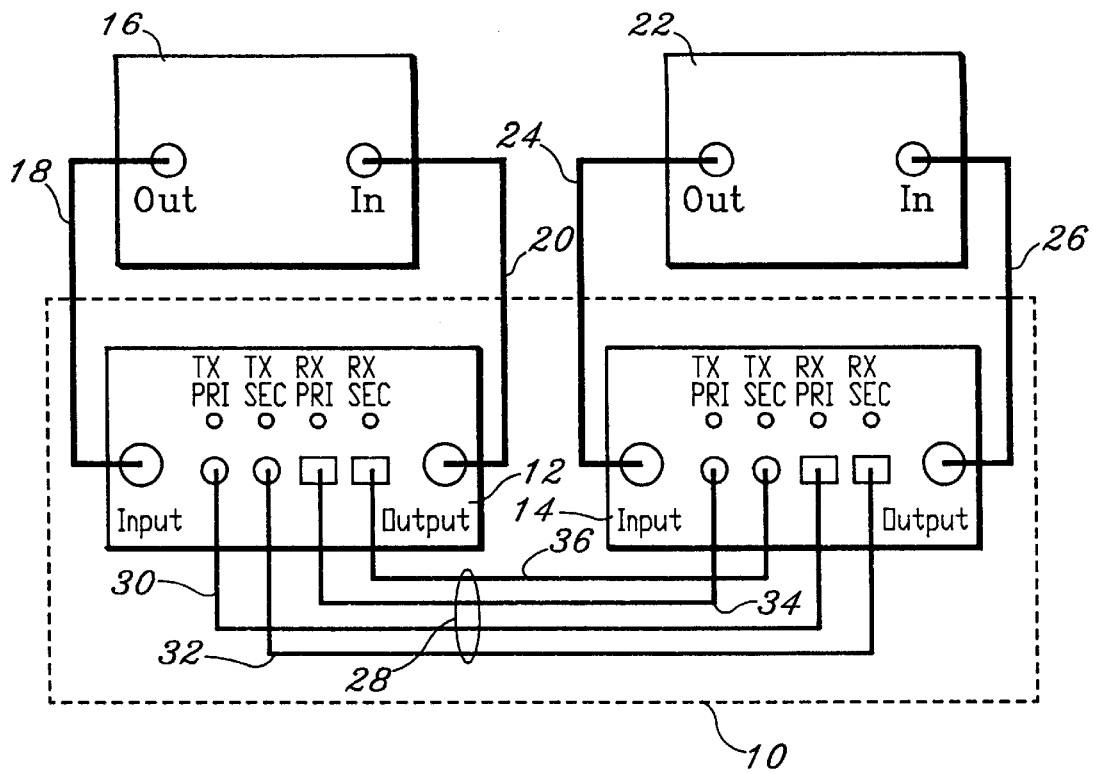
FIG. 1 is a block diagram of the apparatus of the present invention.

As shown in FIG. 1, apparatus 10 of the present invention comprises transceivers 12 and 14 that effect data communication between data systems 16 and 22. Transceiver 12 receives digital data from data system 16 over data buses 18 and also transmits data to data system 16 over bus 20. Transceiver 14 receives digital data from data system 22 over data buses 24 and also transmits data to data system 22 over bus 26. Transceivers 12 and 14 communicate with each other via optical signals transmitted over optical link 28 that comprises fiber optic cables 30, 32, 34 and 36. In a preferred embodiment, transceivers 12 and 14 are substantially identical in construction, operation and function. Although the ensuing discussion is in terms of transceiver 12, it is to be understood that the description is also applicable to the transceiver 14.

The circuitry and systems of the present invention are configured to provide significant decoupling to minimize stray AC (alternating current) signals, noise and other spurious signals. Decoupling capacitors that are in close proximity to integrated circuits are preferably chip-type capacitors. All other decoupling is provided by a combination of MLC ceramic capacitors and electrolytic capacitors. It is most preferred if the electrical conductor length over which high-speed signals are transmitted be kept as short as possible. Unused gates have their inputs connected so as to reduce stray switching transients. In a most preferred embodiment, the components of the transceivers are laid out on a ground-plane printed circuit card in order to minimize local potential differences and ground impedances due to lead inductances.

Although the ensuing description describes the present invention as providing transceivers having redundancy through the use of a pair of receivers and a pair of receivers, it is to be understood that the present invention may be implemented by transceivers that utilize a single transmitter and a single receiver.

The ensuing description refers to "pseudo-ECL" or "pECL" logic which provides a certain degree of compatibility with TTL and other forms of logic but which does not require negative power supply voltage, e.g. −5.2 VDC, as required by conventional ECL logic. This logic results in integrated circuits being operated in an "upside down" mode. Since conventional ECL signals are referenced to Vcc, use of pECL signals results in the ECL signals having a nominal +3.25 VDC logic low level ("0") and a +4.1 VDC logic high level ("1").

Figure 2:
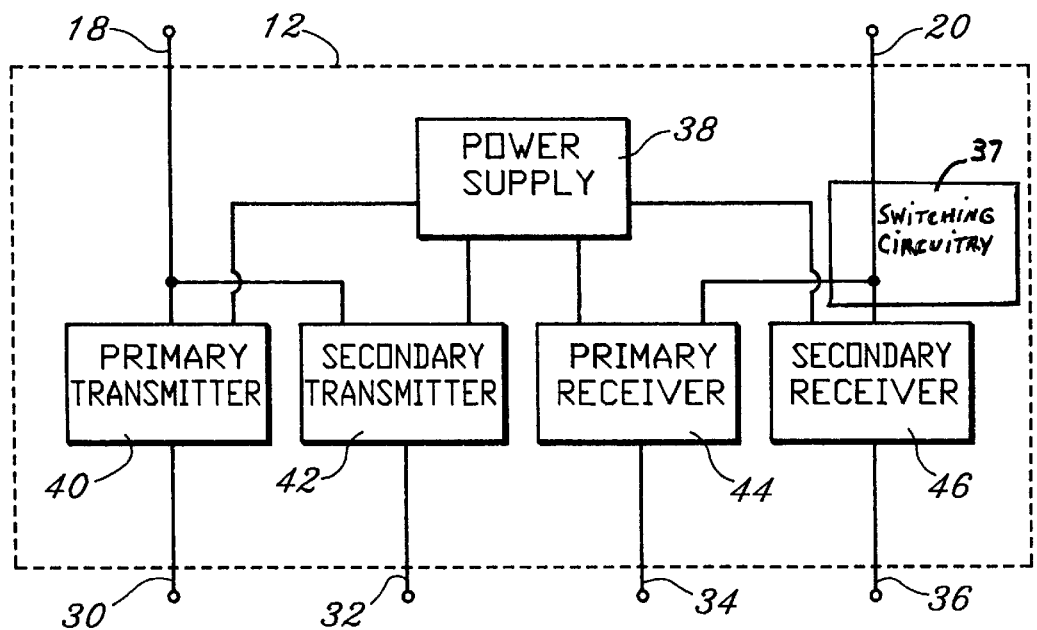
FIG. 2 is a block diagram of a transceiver depicted in FIG. 1.

As shown in FIG. 2, transceiver 12 comprises a power supply 38, a primary transmitter 40, a secondary transmitter 42, a primary receiver 44 and a secondary receiver 46. Identical signals are transmitted by primary and secondary transmitters 40 and 42. Similarly, the primary and secondary transmitters (not shown) of transceiver 14 transmit signals that are substantially identical. In a most preferred embodiment, all transmission of signals by the primary and secondary transmitters are in serial format.

Referring to FIG. 2, during proper operation of apparatus 10, each primary transmitter of the transceiver 12 and 14 transmit optical signals to its corresponding primary receiver. Each primary receiver receives the optical signals, converts such signals into electrical pulses, and determines if the signal quality is acceptable. In the event that the primary receiver indicates that the signal quality of the primary link is unacceptable, it so indicates to the switchover circuitry which routes the output of the secondary receiver to the electrical output. A method of manual control which overrides the automatic selection may also be provided outputs to external equipments indicating the status of the primary and secondary links will be made available if desired. Thus, the present invention provides a redundancy in signal transmission and reception to ensure efficient and accurate signal transference between data systems 16 and 22. Apparatus 10 of the present invention allows for the transfer of data at a rate of 125 Mbps (mega-bits per second).

2. The Power Supply

Figure 6:
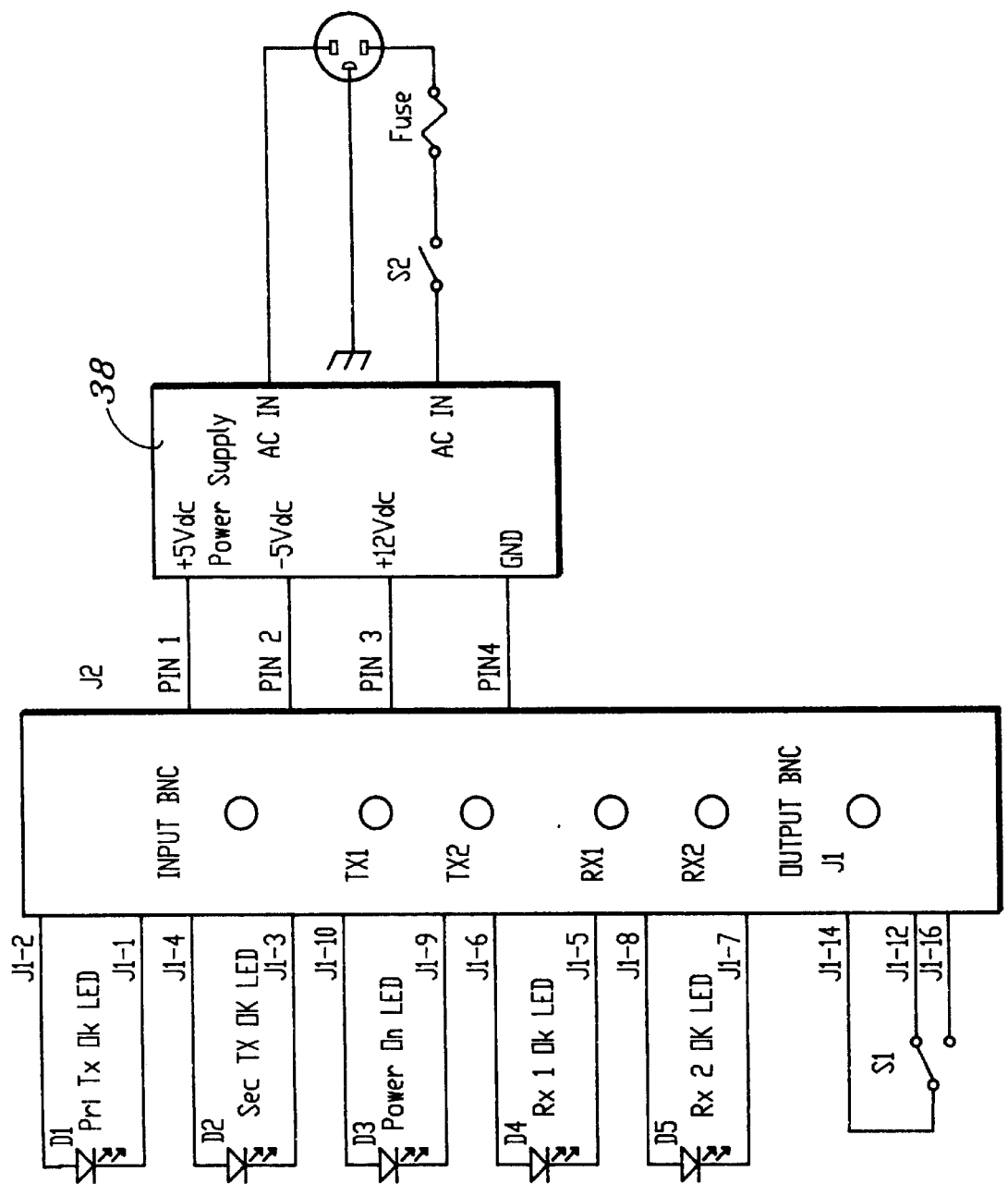
FIG. 6 is a schematic illustration of a power supply depicted in FIG. 2.

Referring to FIGS. 2 and 6, in a preferred embodiment, power supply 38 is a linear regulated supply with 3 outputs: +5.0 VDC @2.0 Amps, −5.0 VDC @ 0.4 Amps, and +12 VDC @ 0.4 Amps. Preferably, power supply 38 is configured to function with either 120 or 240 VAC, +/−10%, 47–63 Hz. In a preferred embodiment, power supply 38 includes circuitry indicating that the correct power is being supplied to the transmitters 40, 42 and receivers 44 and 46. In a preferred embodiment, such indicating circuitry includes light emitting diodes (LED) D3 (see FIG. 6) on a front end panel to provide visual indication to users of apparatus 10 of the present invention. In an alternate embodiment, the indicating circuitry provides a remote TTL-level signal that indicates either correct power supply operation or power supply failure.

In a preferred embodiment, power supply 38 includes commercially available Corcom Power Entry Module that comprises an IEC cord connector for attaching an appropriate power cord, a fuse of appropriate rating (preferably about 2.0 amps), a power on/off switch, a power line noise filter, and terminals for hot, neutral and safety ground connections.

3. The Transmitters

Figure 4:
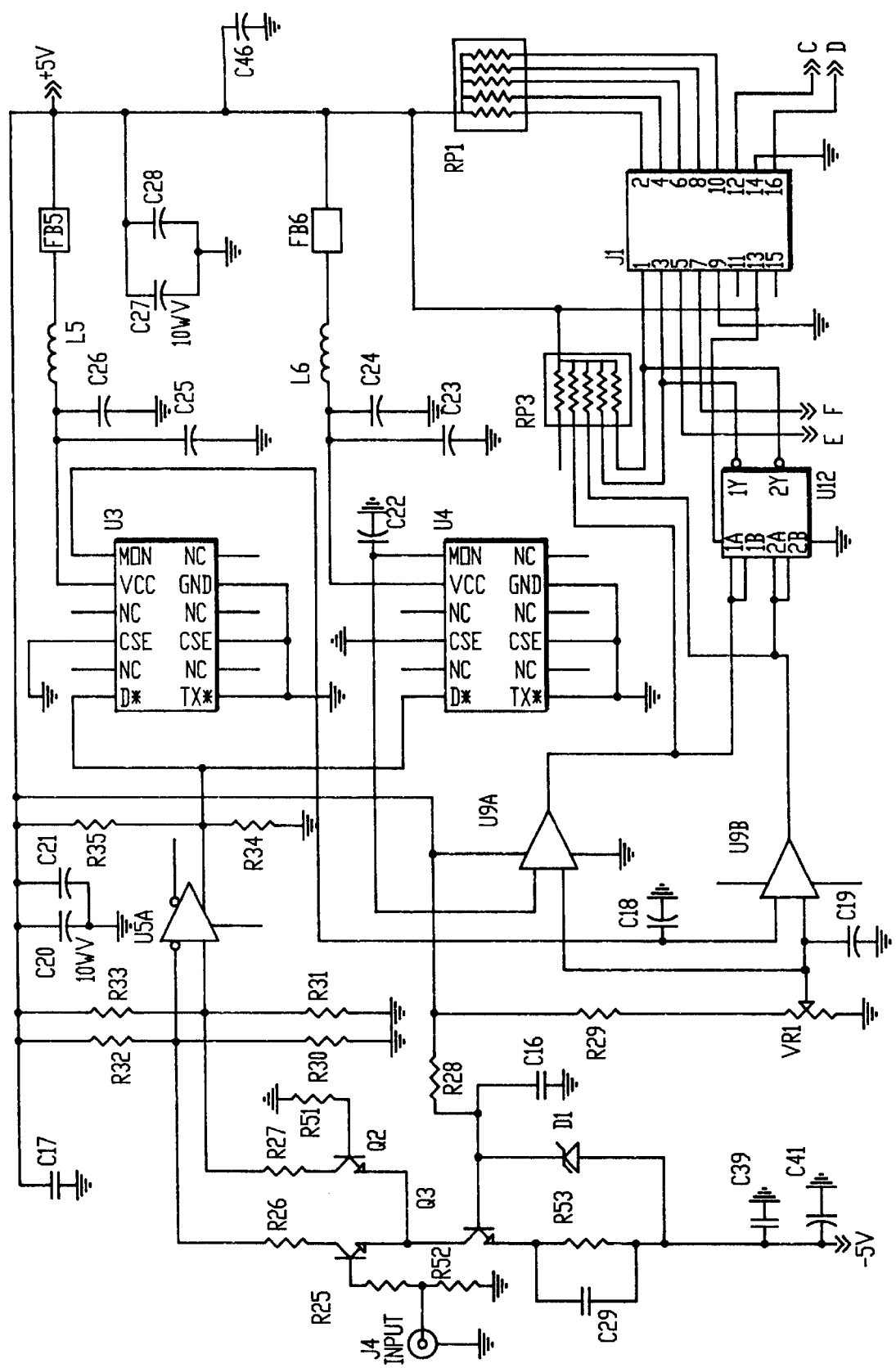
FIG. 4 is a schematic diagram of a primary and secondary data transmitter depicted in FIG. 2.

Referring to FIG. 4, there is shown a schematic diagram of the primary and secondary transmitter 40 and 42, respectively. Both transmitters 40 and 42 are driven in parallel and transmit the same data. In a most preferred embodiment, transmitters 40 and 42 transmit data in serial format. Digital data signals on bus 18 are inputted into connector J4. Resistor R25 is coupled between connector J4 and the base of transistor Q8, which is discussed in detail below. Resistor R52 is connected between connector J4 and ground potential. Resistors R25 and R52 provide the appropriate input impedance seen "looking into" connector J4. In a preferred embodiment, resistors R25 and R52 have resistance values of about 10 ohms and 75 ohms, respectively.

Typically, the data signals received from many data systems are balanced bipolar signals. Therefore, a transistor differential pair driven by a constant current source is used as an interface circuit. The transistor differential pair comprises transistors Q2 and Q8. The current source comprises transistor Q3, diode D1 and resistor R53. The constant current source will be discussed in detail below.

As shown in FIG. 4, resistor R51 is connected between the base of transistor Q2 and ground potential. In a preferred embodiment, resistor R51 has a resistance of about 1 ohm. Thus, the base of transistor Q2 is substantially at ground potential thereby providing a zero volt switch point of the circuit. In a preferred embodiment, transistors Q2 and Q8 are MPS5179-type transistors.

Referring to FIG. 4, in a preferred embodiment, transistor Q3, diode D1 and resistor R53 are configured to provide a constant 10 ma (milliamperes) current source. Resistor 28 provides the proper bias voltage at the base of transistor Q3. In a preferred embodiment, resistors R28 and R53 have resistances of about 300 ohms and 150 ohms, respectively. In a preferred embodiment, diode D1 is a 1N4681B diode. Capacitor C29 is a bypass capacitor and is coupled across resistor R53. In a preferred embodiment, capacitor C29 has a capacitance of about 100 pf (picofarads). Capacitor C16 is a decoupling capacitor and preferably has a capacitance of about 0.01 uf.

As shown in FIG. 4, capacitors C39 and C41 are decoupling capacitors connected between the −Vcc supply voltage and ground potential. In a preferred embodiments capacitors C39 and C41 have capacitances of 0.1 uf and 100 uf, respectively. In a preferred embodiment, capacitor C41 is an electrolytic capacitor and has 10 volt rating.

Referring to FIG. 4, terminating resistors R30, R31, R32, and R33 provide a predetermined voltage potential. Resistors R32 and R33 are connected between +Vcc and resistors R30 and R31, respectively. Pull-up resistor R27 is connected between the collector of transistor Q2 and the junction of resistors R31 and R33. Pull up resistor R26 is connected between the collector of transistor Q8 and the junction of resistors R30 and R32. The collectors of transistors Q2 and Q8 form a complementary output that interfaces with receiver/driver U5A.

Referring to FIG. 4, the resistance values of pull-up resistors R26, R27, and terminating resistors R30, R31, R32 and R33 provide the proper voltage potentials and terminate the transmission line. In a preferred embodiment, resistors R30 and R31 each have a resistance of about 620 ohms and resistors R32 and R33 each have a resistance of about 120 ohms.

Capacitors C17, C20 and C21 are decoupling capacitors and are connected between +Vcc and ground potential. In a preferred embodiment, capacitors C17, C20 and C21 have capacitances of 0.1 uf, 100 uf and 1000 pf. Preferably, capacitor C20 is electrolytic and has a rating of 10 volts.

Referring to FIG. 4, receiver/driver U5A is preferably an ECL (emitter coupled logic) receiver/driver. The purpose of ECL will be discussed below. Receiver/driver U5A converts the analog bipolar voltages at the junctions of resistors R26, R30, R32 and at the junctions of resistors PR27, R31, R33 into to pECL signals. Thus, as shown in FIG. 4, only one output of receiver/driver U5A is used.

Resistors R34 and R35 are configured as a termination network and provide a predetermined voltage potential at the output of receiver/driver U5A to ensure proper pECL output signal levels. Resistor R34 is connected between the output of receiver/driver U5A and ground potential. Resistor R35 is connected between +Vcc and the inverted output of receiver/driver U5A. In a preferred embodiment, resistors R34 and 35 have resistances of about 270 ohms and 160 ohms, respectively. Receiver/driver USA is configured in the single-ended mode. The output of receiver/driver U5A is inputted into the optical transmitter U3 of the primary transmitter 40 (see FIG. 2).

Referring to FIG. 4, optical transmitter U3 has an input that is compatible with the output from receiver/driver U5A. Thus, for examples if receiver/driver U5A outputs a pECL signal, then the input interface of optical transmitter is configured for reception of pECL signals. In a preferred embodiment, optical transmitter U3 integrates a temperature-stabilized laser diode, driver electronics and a back-facet photodiode for monitoring the output signals. The photodiode monitors the light output of the laser diode by measuring the light that escapes from the rear of the diode. The measured light is amplified and provided as a voltage monitor output. Preferably, the aforementioned laser diode is configured so as not to require a Peltier cooler or other active temperature-control device. Preferably, optical transmitter U3 includes an ST fiber optic connector and is adapted for use with either single-mode or multi-mode fiber. In a preferred embodiment, the case of the optical transmitter U3 is coupled to ground potential to minimize or substantially eliminate noise emission.

In a most preferred embodiment, optical transmitter U3 is a laser transmitter having operational characteristics similar to the MRTL laser transmitter manufactured by MRV Technologies, Inc. of Chatsworth, Calif. Although the ensuing discussion of optical transmitter U3 is in terms of the aforementioned MRTL laser transmitter, it is to be understood that the optical transmitter U3 may be implemented by any commercially available optical transmitters having the operational characteristics similar to the aforementioned MRTL laser transmitter manufactured by MRV Technologies, Inc.

FIG. 4 illustrates the interconnections of the optical transmitter U3 when configured as a MRTL laser transmitter. The inverted data output of receiver/driver U5A is connected to the inverted data input D* of optical transmitter U3. The active-low transmitter enable line TX* of optical transmitter U3 is coupled to ground potential in order to continuously enable optical transmitter U3. Preferably, the laser diode transmits optical signals with approximately a 50% duty cycle. The "CSE" shielding pins of transmitter U3 are connected to ground potential.

Referring to FIG. 4, in order to monitor the output of the laser diode, optical transmitter U3 further includes a monitor output MON that is connected to one input of comparator U9B. The other input of comparator U9B is connected to variable resistor or potentiometer VR1 which sets the switching threshold for the circuit. Resistor R29 is connected between +Vcc and potentiometer VR1 and provides a predetermined bias voltage. The output of comparator U9B is connected to one end of a terminating resistor located in resistor network RP3. The other end of the terminating resistor is connected to +Vcc. Comparator U9B monitors the light emitted from the laser diode. The switching threshold of comparator U9B is set that so that the output of comparator U9B is at a logic low level when the optical transmitter U3 transmits valid data at an acceptable light level. Thus, when the output of comparator U9B is at a logic low level, a "no fault" condition exists. When the light level emitted by the laser diode decreases below a predetermined level, the output of comparator U9B switches to logic high level.

Referring to FIG. 4, in a preferred embodiment, resistor R29 has a resistance of about 3.0 kilo-ohms and potentiometer VR1 has a resistance range between about 0 ohms and 2.0 kilo-ohms. Decoupling capacitors C18 and C19 are connected between the inputs of comparator U9B and ground potential. In a preferred embodiment, each capacitor C18 and C19 has a capacitance of about 0.1 uf. In a preferred embodiment, the terminating resistor in resistor network RP3 has a resistance of about 2.2 kilo-ohms. The output of comparator U9B is connected to an input of inverter/driver U12. When the output of comparator U9B switches to a logic high level, the corresponding output of inverter/driver U12 switches to a logic low level. The output of inverter/driver U12 is connected to one end of a terminating resistor that is located within resistor network RP3. The other end of the terminating resistor is connected to +Vcc. In a preferred embodiment, each terminating resistor in resistor network RP3 has a resistance of about 2.2 kilo-ohms. The output of inverter/driver U12 is also connected to pin 1 of connector J1. Thus, when inverter/driver U12 switches to a logic low level, pin 1 is also at a logic low level. Therefore, when primary transmitter 40 fails, pin 1 of connector J1 has a logic low level. Pin 1 of connector J1 may be used to provide a remote TTL level indication of the status of primary transmitter 40.

Referring to FIG. 4, in an alternate embodiment, an LED may be used to indicate when pin 1 of connector J1 is at a logic low level thereby providing a visual indication as to whether primary transmitter 40 is operating in a satisfactory manner. In such an embodiment, the cathode of the diode is connected to pin 1 of connector J1 and the anode of the diode is connected to pin 2 of connector J1. Pin 2 of connector J1 is connected to one end of a resistor in resistor network RP1. The other end of the resistor network is connected to +Vcc. If the primary transmitter is not receiving any data from data system 16, then the LED connected between pins 1 and 2 of connector J1 may be either on or off, depending on the logic level of the data bus 18. In a preferred embodiment, each resistor in resistor network RP1 has a resistance of about 330 ohms.

Decoupling capacitors, inductors (RF chokes) and ferrite beads are used to minimize and filter out any noise or AC ripple on the +Vcc line. As shown in FIG. 4, inductor L5 is connected between the +Vcc input of optical transmitter U3. In a preferred embodiment, inductor L5 has an inductance of about 1 uh (microhenry). Decoupling capacitors C25 and C26 are connected between the +Vcc input of optical transmitter U3, which is also connected to one end of inductor L5, and ground potential. In a preferred embodiment, capacitors C25 and C26 have capacitances of about 0.01 uf. Ferrite bead FB5 is connected between the other end of inductor L5 and +Vcc. Decoupling capacitor C27 and C28 are connected between +Vcc and ground potential. In a preferred embodiment, capacitors C27 and C28 have capacitances of about 100 uf and 0.1 uf, respectively. Preferably, capacitor C27 is electrolytic and has a rating of 10 volts The ensuing description is of the interconnection secondary transmitter 42. In a preferred embodiment, secondary transmitter 42 is substantially identical in function and physical configuration as primary transmitter 40. Similar to primary transmitter 40, secondary transmitter 42 includes an optical transmitter U4 as shown in FIG. 4. In a preferred embodiment, optical transmitter is also configured as a MRTL laser transmitter. The inverted data output of receiver/driver U5A is also connected to the inverted data input D* of optical transmitter U4. The active-low transmitter enable line TX* of optical transmitter U4 is coupled to ground potential in order to continuously enable optical transmitter U4. Preferably, the laser diode transmits optical signals with approximately a 50% duty cycle.

Referring to FIG. 4, in order to monitor the output of the laser diode, optical transmitter U4 further includes a monitor output MON that is connected to one input of comparator U9A. The other input of comparator U9A is connected to potentiometer VR1 (discussed above) which sets the switching threshold for the comparator U9A. The output of comparator U9A is connected to one end of a terminating resistor located in resistor network RP3. The other end of the terminating resistor is connected to +Vcc. Comparator U9A monitors the light emitted from the laser diode of optical transmitter U4. The switching threshold of comparator U9A is set that so that the output of comparator U9A is at a logic low level when the optical transmitter U4 transmits valid data at an acceptable light level. Thus, when the output of comparator U9A is at a logic low level, a "no fault" condition exists. When the light level emitted by the laser diode decreases below a predetermined level, the output of comparator U9A switches to logic level high.

In a preferred embodiment, the terminating resistor in resistor network RP3 has a resistance of about 2.2 kilo-ohms.

The output of comparator U9A is connected to an input of inverter/driver U12. When the output of comparator U9A switches to a logic high level, the corresponding output of inverter/driver U12 switches to a logic low level. The output of inverter/driver U12 is connected to one end of a terminating resistor that is located within resistor network RP3. The other end of the terminating resistor is connected to +Vcc. In a preferred embodiment, the terminating resistor in resistor network RP3 has a resistance of about 2.2 kilo-ohms. The output of inverter/driver U12 is also connected to pin 3 of connector J1. Thus, when inverter/driver U12 switches to a logic low level, pin 3 is also at a logic low level. Therefore, when secondary transmitter 42 fails, pin 3 of connector J1 has a logic low level. Pin 3 of connector J1 may be used to provide a remote TTL level indication of the status of secondary transmitter 42.

Referring to FIG. 4, in an alternate embodiment, an LED may be used to indicate when pin 3 of connector J1 is at a logic low level thereby providing a visual indication as to whether secondary transmitter 42 is operating in a satisfactory manner. In such an embodiment, the cathode of the diode is connected to pin 3 of connector J1 and the anode of the diode is connected to pin 4 of connector J1. Pin 3 of connector J1 is connected to one end of a resistor in resistor network RP1. The other end of the aforementioned resistor is connected to +Vcc. If the secondary transmitter 42 is not receiving any data from data system 16, then the LED connected between pins 3 and 4 of connector J1 may be either on or off, depending on the logic level of the data bus 18.

Referring to FIG. 4, decoupling capacitor C22 is connected between the monitor output MON of optical transmitter U4 and ground potential In a preferred embodiment, capacitor 22 has a capacitance of about 0.1 uf.

Decoupling capacitors, inductors (RF chokes) and ferrite beads are used to minimize and filter out any noise or AC ripple on the +Vcc line. As shown in FIG. 4, inductor L6 is connected between the +Vcc input of optical transmitter U4. In a preferred embodiment, inductor L6 has an inductance of about 1 uh (microhenry). Decoupling capacitors C23 and C24 are connected between the +Vcc input of optical transmitter U4, which is also connected to one end of inductor L6, and ground potential. In a preferred embodiment, capacitors C23 and C24 have capacitances of about 0.01 uf. Ferrite bead FB6 is connected between the other end of inductor L6 and +Vcc.

4. The Receivers

Figure 3:
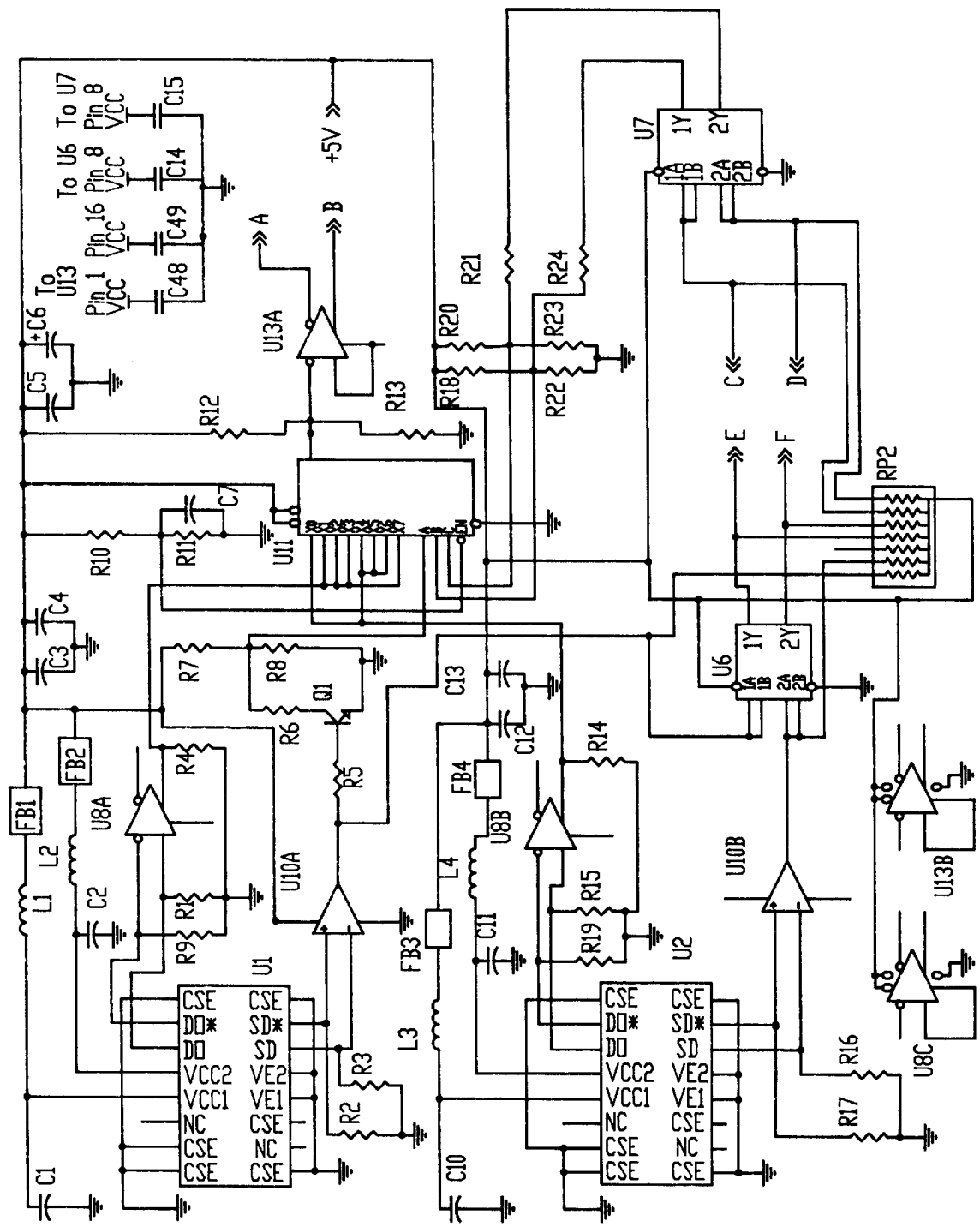
FIG. 3 is a schematic diagram of a primary and secondary data receivers depicted in FIG. 2.

Referring to FIG. 3, there is shown a schematic diagram of the primary and secondary receivers 44 and 46, respectively. Both receivers 44 and 46 are driven in parallel and receive substantially the same data. In a most preferred embodiment, receivers 44 and 46 receive data in serial format. Each receiver 44 and 46 receives optical data signals transmitted over optical link 28. Each receiver converts the optical signals to a digital data signals. The digital data signals are then converted to balanced bipolar signals. The balanced bipolar signals are then outputted onto buses 20 and 26 for input into data systems 16 and 22.

Referring to FIG. 3, there is shown a schematic illustration of the primary and secondary optical receivers 44 and 46. In a preferred embodiment, each optical receiver integrates a photo detector, amplifier, clock recovery circuitry, data detection circuitry, signal quality sensing circuitry and an ST fiber optic connector. In a preferred embodiment, the aforementioned circuitry is contained within a DIP (dual in-line package) case. In a preferred embodiment, the electrical interface of each receiver is PECL.

In a most preferred embodiment, optical receiver U1 is a fiber optic receiver having operational characteristics similar to the MRV MRRST-6SO Fiber Optic Receiver module manufactured by MRV Technologies, Inc. which was mentioned above. Although the ensuing discussion of optical receiver U1 is in terms of the aforementioned MRV MRRST-6SO Fiber Optic Receiver, it is to be understood that the optical receiver U1 may be implemented by any commercially available optical receiver having the operational characteristics similar to the aforementioned MRV MRRST-6SO Fiber Optic Receiver module.

FIG. 3 illustrates the interconnections of the optical receiver U1 when configured as a MRV MRRST-6SO Fiber Optic Receiver module. Receiver U1 receives optical signals from optical link 28 and outputs differential pECL signals at the DO and DO* pins. These output signals are inputted into ECL receiver/driver U8A. Terminating resistors R1 and R9 are connected between the non-inverted and inverted inputs, respectively, of receiver/driver U8 and ground potential. In a preferred embodiment, resistors R1 and R9 each have a resistance of 390 ohms. If PECL logic is utilized, the VE1 and VE2 pins of receiver U1 are connected to ground potential and the VCC1 pin is connected to +5.0 VDC. This allows the use of a standard power supply for both TTL and pECL circuitry.

The inverted data output of receiver/driver U8A is input into multiplexer U11 as a single ended signal. Terminating resistor R4 is connected between the inverted output of receiver/driver U8A and ground potential. In a preferred embodiment, resistor R4 has a resistance of about 390 ohms.

Referring again to FIG. 3, multiplexer U11 is preferably an 8-to-1 multiplexer. As will be discussed below, multiplexer U11 selects for further processing either the data stream outputted from optical receiver U1 or optical receiver U2 In a preferred embodiment, multiplexer U11 is a MC10164 8-to-1 multiplexer. The output of multiplexer U11 is inputted into the non-inverted input of receiver/driver U13A. Resistors R12 and R13 provide the proper bias for the output of multiplexer U11. In a preferred embodiment, resistors R12 and R13 have resistances of about 160 and 270 ohms, respectively. Resistors R10 and R11 form a voltage divider and provide an enabling signal into the enable input EN of multiplexer U11. In a preferred embodiment, resistors R10 and R11 have resistances of 1.6 kilo-ohms and 2.7 kilo-ohms, respectively. Capacitor C7 provides decoupling and preferably has a capacitance of 0.1 uf. Capacitors C48 and C49 provide further decoupling at the Vcc inputs of multiplexer U11. In a preferred embodiment, capacitors C48 and C49 each has a capacitance of 0.01 uf.

Figure 5:
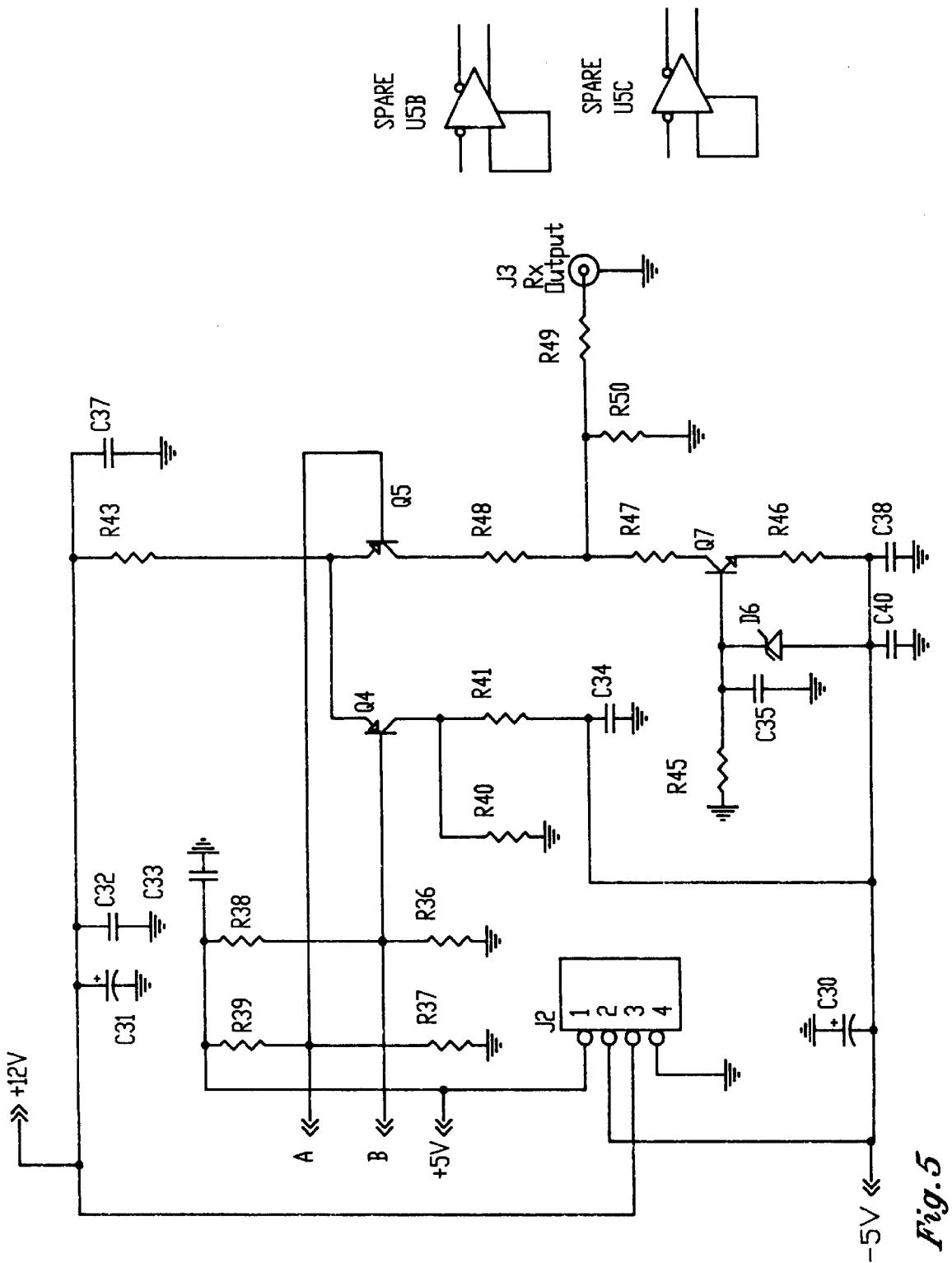
FIG. 5 is a schematic illustration of interface circuitry used by the primary and secondary receivers depicted in FIG. 3.

Since the signal outputted by multiplexer U11 is single-ended, the inverted input of receiver/driver U13A is connected to the internal bias point of receiver/driver U13A. The internal bias point is fixed at the single-ended midpoint. Thus, this configuration effects a conversion of the single-ended signal, which is inputted into receiver/driver U13A, to a differential signal that is capable of driving the output circuitry that is shown in FIG. 5. The output circuitry will be discussed below in detail. In a preferred embodiment, receiver/driver U13A is a MC10114 ECL driver.

Referring to FIG. 3, optical receiver U1 further includes a differential signal output on the pins labeled SD and SD*. This differential output is terminated by resistors R2 and R3. In a preferred embodiment, resistors R2 and R3 each has a resistance of about 390 ohms. The aforementioned differential output signal is inputted into comparator U10A. Comparator U10A outputs a logic low level signal if the quality of the optical signal U1 received by the receiver is acceptable Whether the signal received by the optical receiver U1 is acceptable depends upon certain criteria including signal amplitude and the clock rate. The output of comparator U10A is inputted into buffer/driver U6A and is also connected to one end of a resistor in resistor network RP2. The other end of the aforementioned resistor is coupled to +Vcc. In a preferred embodiment, each resistor in the resistor network RP2 has a resistance of about 2.2 kilo-ohms. In a preferred embodiment, buffer/driver U6 is a SN75461 buffer/driver. The output of buffer/driver U6 connected to pin 5 of connector J1 (see FIG. 4) The signal at pin 5 may be used for a remote TTL-level fault indication. As shown in FIG. 6, an LED D4 can be placed across pins 5 and 6 to provide a visual indication that optical receiver U1 is sensing acceptable signals. Capacitor C14 is decoupling capacitor for buffer/driver U6 and preferably has a capacitance of about 0.1 uf.

Referring again to FIG. 3, the output of comparator U10A is also connected to one end of resistor R5. The other end of resistor R5 is connected to the base of transistor Q1. In a preferred embodiment, resistor R5 has a resistance of about 100 kilo-ohms. The emitter of transistor Q1 is connected to ground potential. The collector is of transistor Q1 is biased by resistors R6, R7 and R8 to provide an ECL level signal to the "A" input of multiplexer U11. The aforementioned ECL level signal has a logic high level if optical receiver U1 is receiving acceptable signals. In a preferred embodiment, resistors R6, R7 and R8 have resistances of about 3.6 kilo-ohms, 1.6 kilo-ohms and 7.5 kilo-ohms, respectively.

Referring to FIG. 3, decoupling capacitors, L-C filter networks and ferrite beads are used to filter out AC signals, noise and other spurious signals from pins of optical receiver U1 or wires that carry +Vcc or −Vcc. A ferrite bead FB1 and an L-C filter network comprising capacitor C1 and L1 filter out AC signals, noise and other spurious signals from the VCC1 pin of optical receiver U1. Similarly, a ferrite bead FB2 and an L-C filter network comprising capacitor C2 and L2 filter out AC signals, noise and other spurious signals from the VCC2 pin of optical receiver U1. In a preferred embodiment, each capacitor C1 and C2 has a capacitance of about 0.01 uf. In a preferred embodiment, each inductor L1 and L2 has an inductance of about 1.0 uh. Additional decoupling is provided by capacitors C3, C4, C5 and C6. In a preferred embodiment, capacitors C3 and C5 each have a capacitance of about 0.1 uf, capacitors C4 has a capacitance of about 0.01 uf and capacitor C6 has a capacitance of about 100 uf.

Referring to FIGS. 2 and 3, secondary receiver 46 comprises optical receiver U2. In a most preferred embodiment, optical receiver U2 is a fiber optic receiver having operational characteristics similar to the MRV MRRST-6SO Fiber Optic Receiver module manufactured by MRV Technologies, Inc. as described above. Although the ensuing discussion of optical receiver U2 is in terms of the aforementioned MRV MRRST-6SO Fiber Optic Receiver, it is to be understood that the optical receiver U2 may be implemented by any commercially available optical receiver having the operational characteristics similar to the aforementioned MRV MRRST-6SO Fiber Optic Receiver module.

FIG. 3 illustrates the interconnections of the optical receiver U2 when configured as a MRV MRRST-6SO Fiber Optic Receiver module. Receiver U2 receives optical signals from optical link 28 and outputs differential pECL signals at the DO and DO* pins. These output signals are inputted into ECL receiver/driver U8B. Terminating resistors R15 and R19 are connected between the non-inverted and inverted inputs, respectively, of receiver/driver U8B and ground potential. In a preferred embodiment, resistors R15 and R19 each have a resistance of 390 ohms. As mentioned above, if pECL logic is utilized, the VE1 and VE2 pins of receiver U1 are connected to ground potential and the VCC1 pin is connected to +5.0 VDC. This allows the use of a standard power supply for both TTL and PECL circuitry.

The inverted data output of receiver/driver U8B is inputted into multiplexer U11 as a single ended signal. Terminating resistor R14 is connected between the inverted output of receiver/driver U8B and ground potential. In a preferred embodiment, resistor R14 has a resistance of about 390 ohms.

Referring to FIG. 3, optical receiver U2 further includes a differential signal output on the pins labeled SD and SD*. This differential output is terminated by resistors R16 and R17. In a preferred embodiment, resistors R16 and R17 each has a resistance of about 390 ohms. The aforementioned differential output signal is inputted into comparator U10B. Comparator U10B outputs a logic low level signal if the quality of the optical signal U2 received by the receiver is acceptable. Whether the signal received by the optical receiver U2 is acceptable depends upon certain criteria including signal amplitude and the clock rate. The output of comparator U10B is inputted into buffer/driver U6 and is also connected to one end of a resistor in resistor network RP2. The other end of the aforementioned resistor is coupled to +Vcc. The output of buffer/driver U6 connected to pin 7 of connector J1 (see FIG. 4). The signal at pin 7 may be used for a remote TTL-level fault indication. As shown in FIG. 6, an LED D5 can be placed across pins 7 and 8 to provide a visual indication that optical receiver U2 is sensing acceptable signals.

Referring to FIG. 3, decoupling capacitors, L-C filter networks and ferrite beads are used to filter out AC signals, noise and other spurious signals from pins of optical receiver U2 or wires that carry +Vcc or −Vcc. A ferrite bead FB3 and an L-C filter network comprising capacitor C10 and L3 filter out AC signals, noise and other spurious signals from the VCC1 pin of optical receiver U2. Similarly, a ferrite bead FB3 and an L-C filter network comprising capacitor Cdl and L4 filter out AC signals, noise and other spurious signals from the VCC2 pin of optical receiver U2. In a preferred embodiment, each capacitor C10 and C11 has a capacitance of about 0.01 uf. In a preferred embodiment, each inductor L3 and L4 has an inductance of about 1.0 uh. Additional decoupling is provided by capacitors C12 and C13. In a preferred embodiment, capacitors C12 and C13 have capacitances of about 0.1 uf and 0.01 uf, respectively.

Referring to FIGS. 3 and 6, the position switch S1 determines whether the data stream of primary receiver 44 or secondary receiver 46 is to be processed. When switch S1 is in a first position, the data stream outputted from primary receiver 44 is to be processed. When switch S1 is in a second position, the data stream outputted from primary receiver 46 is to be processed. When switch S1 is in a third position, transceiver 12 (see FIG. 2) operates in an automatic mode whereby the data outputted from the primary receiver 44 is processed until it is determined that the signals received by optical receiver U1 are not acceptable. Once this situation occurs, transceiver 12 automatically ceases outputting data from primary receiver 44 and begins outputting data from secondary receiver 46.

Referring to FIGS. 3, 4 and 5, the pole of switch S1 is connected to pin 14 of connector J1. As shown in FIG. 4, pin 14 of connector J1 is connected to ground potential. One contact of switch S1 is connected to pin 12 of connector J1. As shown in FIGS. 3 and 4, pin 12 is connected to an input of buffer/driver U7. Another contact of switch S1 is connected to pin 16 of connector J1. As shown in FIGS. 3 and 4, pin 16 of connector J1 is connected to an input of buffer/driver U7. The aforementioned inputs of buffer/driver U7 are also connected to respective resistors in resistor network RP2. Thus, unless the inputs of buffer/driver U7 remain at a logic high level unless they are driven low. Resistors R18 and R22 form a divider network and provide the proper bias voltage for one of the outputs of buffer/driver U7. Resistor R24 is a current limiting resistor. In a preferred embodiment, resistors R18, R22 and R24 have resistances of 1.6 kilo-ohms, 7.5 kilo-ohms and 3.6 kilo-ohms, respectively. Resistors R20 and R23 form a divider network and provide the proper bias voltage for the other output of buffer/driver U7. Resistor R21 is a current limiting resistor. In a preferred embodiment, resistors R20, R21 and R23 have resistances of 1.6 kilo-ohms, 3.6 kilo-ohms and 7.5 kilo-ohms, respectively. In a preferred embodiment, buffer/driver U7 is a SN75461 buffer/driver. Capacitor C15 is decoupling capacitor for buffer/driver U7 and preferably has a capacitance of about 0.1 uf.

5. Modes of Operation

Referring to FIGS. 4 and 6, when switch S1 is positioned in the first position, transceiver 12 is in the "primary receiver override" mode. In this mode, multiplexer U11 selects the data steam outputted from primary receiver 44, i.e. optical receiver U1, regardless of whether the quality of signals received by optical receiver U1 is acceptable. In this mode, pin 12 of connector J1 is coupled to ground potential and pin 16 is floating. Such a signal configuration causes buffer/driver U7 to output a logic low level signal for input into the "B" input of multiplexer U11 and a logic high level signal for input into the "C" input of multiplexer U11. As a result, multiplexer U11 will select for output the data stream outputted from optical receiver U1.

When switch S1 is positioned in the second position, transceiver 12 is in the "secondary receiver override" mode. In this mode, multiplexer U11 selects the data steam outputted from secondary receiver 46, i.e. optical receiver U2. In this mode, pin 16 of connector J1 is coupled to ground potential and pin 12 is floating. Such a signal configuration causes buffer/driver U7 to output a logic high level signal for input into the "B" input of multiplexer U11 and a logic low level signal for input into the "C" input of multiplexer U11. As a result, multiplexer U11 will select for output the data stream outputted from optical receiver U2.

When switch S1 is positioned in the third position (or the center), transceiver 12 will operate in the automatic mode. In such a mode, both pins 12 and 16 of connector J1 are floating. However, due to resistor network RP2, the inputs of buffer/driver U7 remain at a logic high level thereby causing buffer/driver U7 to output logic high level signals into the "B" and "C" inputs of multiplexer U11. As a result, multiplexer U11 will select the data stream outputted by primary receiver 44, i.e. optical receiver U1, until comparator U10A outputs a logic low level signal thereby indicating the received optical signals are not acceptable. A logic low level signal at the output of comparator U10A cause the transistor Q1 to remain off thereby causing a logic level high signal to be input to the "A" input of multiplexer U11. As a result, multiplexer 12 will select the data stream outputted by secondary receiver 46, i.e. optical receiver 46.

If the scenario arises wherein both inputs to buffer/driver U7 are at a logic low level causing buffer/driver U7 to simultaneously output logic low levels to the "B" and "C" inputs to multiplexer U11, transceiver 12 will operate in the automatic mode discussed above.

6. The Receiver Output Interface Circuitry

Referring to FIGS. 3 and 5, since the signal outputted by multiplexer U11 is a single-ended signal, the inverted input of receiver/driver U13A is connected to the internal bias point of receiver/driver U13A. The internal bias point is fixed at the single-ended midpoint. Thus, this configuration effects a conversion of the single-ended signal, which is inputted into receiver/driver U13A, to a differential signal that is capable of driving the output circuitry that is shown in FIG. 5.

The output interface circuitry receives data streams from the primary receiver 44 or secondary receiver 46 and converts such data into balanced bipolar 750 mV (millivolt) output. The interface circuitry comprises a differential transistor pair comprising transistors Q4 and Q5. In a preferred embodiment, transistors Q4 and Q5 are pnp transistors. Due to relatively high speeds, a current steering configuration is used. The emitters of transistors Q4 and Q5 are fed by resistor 43 which connected to +Vcc (+12VDC). In a preferred embodiment, resistor 43 has a resistance of about 180 ohms. Resistor 43 functions as a constant current source, providing 40 mA (milliamperes) to the emitters of transistors Q4 and Q5. The bases of transistors Q4 and Q5 are fed by the non-inverted and inverted outputs of receiver/driver U13A. Resistors R37 and R39 provide proper impedance termination and biasing for the non-inverted output of receiver/driver U13A. Similarly, resistors R36 and R38 provide proper impedance termination and biasing for the inverted output of receiver/driver U13A. In a preferred embodiment, each of the resistors R38 and R39 has a resistance of about 160 ohms. In preferred embodiment, each of the resistors R36 and R37 has a resistance of about 270 ohms. In a preferred embodiment, transistors Q4 and Q5 are MPSH69 transistors. The receiver output interface circuitry receives power supply voltages through connector J2.

The collector of transistor Q4 is connected to a resistor network comprising resistors R40 and R41. Resistor R40 is connected between the collector of transistor Q4 and ground potential Resistor R41 is connected between the collector of transistor Q4 and −Vcc (−5.0VDC). Resistors R40 and R41 provide a load for the current while the collector of transistor Q5 feeds the output stage. The values of resistors R40 and R41 are chosen so that the collector voltage of transistor Q4 mirror that of transistor Q5. Thus, while the collector voltage of one of the transistors is +750 mV, the collector voltage of the other transistor is −750 mV and vice versa, Such a configuration minimizes potential shifts in the circuit and associated charge pumping of junctions, thereby maintaining the switching speed at a relative high rate. In a preferred embodiment, resistors R40 and R41 have resistances of about 91 ohms and 220 ohms, respectively.

The collector of transistor Q5 is connected to the output stage through resistor R48. In a preferred embodiment, resistor R48 has a resistance of about 1 ohm. The output stage is also connected to the collector of transistor Q7. Transistor Q7, diode D6, resistor R45 and resistor 46 form a constant current source of about −20 mA. The base of transistor Q7 is stabilized to ground potential by resistor R45. Resistors R49 and R50 form a terminating network for the output cable (bus 20 or 26 shown in FIG. 1) with resistor R49 being connected to connector J3. Normally, buses 20 or 26 are terminated in 75 ohms. Resistor R47 is connected between the terminating network and the collector of transistor Q7. In a preferred embodiment, resistors R45, R49 and R50 have resistances of 120 ohms, 5.1 ohms, and 75 ohms, respectively. Such a circuit configuration results transistors Q5 and Q7 seeing two 75 ohm impedances in parallel for a load. When transistor Q5 is off, transistor Q7 supplies 20 mA which produces a −750 mV potential across the load. When Q5 is on, it supplies +40 mA to the output network (the terminating network formed by resistors R49 and R50). Of this +40 mA, 20 mA is absorbed by transistor Q7 leaving a net current of +20 mA. This +20 mA net current produces a +750 mV signal at the load. Capacitors C35, C38 and C40 provide decoupling for the constant current source formed by transistor Q7, resistors R45, R46 and R47, and diode D6. In a preferred embodiment, capacitors C35, C38 and C40 have capacitances of about 0.1 uf, 0.01 uf, and 0.01 uf, respectively. Further decoupling is provided throughout the receiver output interface circuitry by capacitors C30, C31, C32, C33 and C34 and C37. In a preferred embodiment, capacitors C30 and C31 are electrolytic and have capacitances of 22 uf and ratings of 16 volts. In a preferred embodiment, capacitors C32, C33 and C34 have capacitances of about 0.1 uf. In a preferred embodiment, capacitor C37 has a capacitance of about 0.1 uf.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for effecting data transfer between data systems comprising:

a first transceiver having an input for receiving digital data from one of the data systems, an output for serially outputting digital data to the one of the data systems, at least one transmitter comprising a primary and a secondary transmitter for serially converting digital data received at the data input into optical signals, at least one receiver comprising a primary and secondary receiver for receiving optical signals and serially converting the received optical signals into digital data for output to the first transceiver output, the first transceiver further comprising detector circuitry for detecting the level of light of the optical signals received by the primary receiver of the transceiver, the detector circuitry outputting a control signal having a first state indicating the level of light of the received optical signals is above a predetermined threshold and a second state indicating the level of light of the received optical signals is below a predetermined threshold;

a second transceiver having an input for receiving digital data from another one of the data systems, an output for serially outputting digital data to the another one of the data systems, at least one transmitter comprising a primary and secondary transmitter for serially converting digital data received at the input of the second transceiver into optical signals, at least one receiver comprising a primary and secondary receiver for receiving optical signals and serially converting the received optical signals to digital data for output to the second transceiver output, the second transceiver further comprising detector circuitry for detecting the level of light of the optical signals received by the primary receiver of the second transceiver, the detector circuitry outputting a control signal having a first state indicating the level of light of the received optical signals is above a predetermined threshold and a second state indicating the level of light of the received optical signals is below a predetermined threshold;

an optical link connecting the first and second transceivers, the optical link optically linking the transmitter of the first transceiver to the receiver of the second transceiver and optically linking the receiver of the first transceiver to the transmitter of the second transceiver, the optical link comprising optical fibers that optically link the primary transmitter and primary receiver of the first transceiver to the primary receiver and primary transmitter, respectively, of the second transceiver, and optically link the secondary transmitter and secondary receiver of the first transceiver to the secondary receiver and secondary transmitter, respectively, of the second transceiver; and selection circuitry for selecting a first mode of operation wherein the primary transmitter of one transceiver and the primary receiver of the other transceiver transfers data between the data systems, or a second mode of operation wherein the secondary transmitter of one transceiver and the secondary receiver of the other transceiver transfers data between the data systems, the selection circuitry being responsive to the control signals outputted by the detector circuitry such that the selection circuitry selects the first mode when the control signal outputted by the detector has a first state and selects the second mode when the control signal has the second state.

2. The apparatus according to claim 1 wherein the at least one transmitter of the first and second transceivers comprises a primary and a secondary transmitter and the at least one receiver of the first and second transceivers comprises a primary and secondary receiver, the optical link further comprising an additional pair of optical fibers such that the primary transmitter and primary receiver of the first transceiver are optically linked to the primary receiver and primary transmitter, respectively, of the second transceiver, and the secondary transmitter and secondary receiver of the first transceiver are optically linked to the secondary receiver and secondary transmitter, respectively, of the second transceiver.

3. The apparatus according to claim 1 wherein the apparatus further comprises a power supply for supplying power to the first and second transceivers.

4. The apparatus according to claim 1 wherein each transceiver comprises a circuit for converting digital data received from a corresponding data system into balanced bipolar data signals and each transmitter has an input for receiving the balanced bipolar signals.

5. The apparatus according to claim 1 wherein the selection circuitry includes additional circuitry for a selecting a third mode of operation wherein data transfer between the data systems is normally implemented by the primary transmitters and primary receivers of the first and second transceivers until the detector outputs a control signal having the second state whereupon the selection circuitry selects the second mode of operation.

6. The apparatus according to claim 1 wherein the selection circuitry includes a multiplexer having a first data input for receiving data outputted by the primary receiver, a second data input for receiving data outputted by the secondary receiver and a data output, the multiplexer outputting data received from the primary receiver when the selection circuitry selects the first mode and outputting data received from the secondary receiver when the selection circuitry selects the second mode.

7. The apparatus according to claim 1 wherein each transceiver further comprises an interface circuit having an input for receiving data signals outputted by the receiver and an output for outputting data signals to a corresponding data system, the interface circuit converting the data signals outputted by the receiver into balanced bipolar signals.

8. The apparatus according to claim 7 wherein the interface includes an output stage for matching the output impedance of the interface circuit to the impedance of a digital data transmission cable that is adapted for connection to the corresponding data system.

9. The apparatus for effecting data transfer between data systems as claimed in claim 1, wherein the circuit for monitoring the optical quality of the optical signals outputted by the transmitter of the first transceiver comprises:

a laser diode, driver electronics and photodiode for monitoring the optical signals.

10. A method for effecting data transfer between data systems comprising the steps of:

providing an apparatus comprising an optical link having a plurality of optical fibers, a first transceiver, and a second transceiver, each transceiver having a primary transmitter, a primary receiver, a secondary transmitter and a secondary receiver, the optical link optically linking the primary transmitter of the first transceiver to the primary receiver of the second transceiver and optically linking the primary receiver of the first transceiver to the primary transmitter of the second transceiver, the optical link optically linking the secondary transmitter of the first transceiver to the secondary receiver of the second transceiver and optically linking the secondary receiver of the first transceiver to the secondary transmitter of the second transceiver, the apparatus further comprising selection circuitry for selecting a first mode of operation wherein the primary transmitter of one transceiver and the primary receiver of the other transceiver transfers data between the data systems, or a second mode of operation wherein the secondary transmitter of one transceiver and the secondary receiver of the other transceiver transfers data between the data system;

selecting the first mode of operation;

receiving digital data signals from one of the data systems;

serially converting the received digital data signals to optical signals;

serially transmitting the optical signals into one of the optical fibers of the optical link;

serially receiving the optical signals inputted into the one of the optical fibers;

detecting the level of light of the received optical signals;

selecting the second mode of operation if the level of light of the received optical signals is below a predetermined threshold;

serially converting the received optical signals into digital data signals;

inputting the digital data signals into another one of the data systems;

receiving digital data signals from the another one of the data systems;

serially converting the received digital data signals to optical signals;

serially transmitting the optical signals into another one of the optical fibers in the optical link;

receiving the optical signals inputted into the optical fiber;

detecting the level of light of the received optical signals;

selecting the second mode of operation if the level of light of the received optical signals is below a predetermined threshold;

serially converting the received optical signals into digital data signals; and inputting the digital data signals into the one of the data systems.

11. The method according to claim 10 wherein step (b) further includes serially converting the data signals received from the one of the data systems into bipolar balanced signals.

12. The method according to claim 10 wherein step (f) further includes serially converting the data signals into bipolar balanced signals.

13. The method according to claim 10 wherein step (h) further includes serially converting the data signals into bipolar balanced signals.

14. The method according to claim 10 wherein step (1) further includes serially converting the data signals into bipolar balanced signals.

15. The method for effecting data transfer between data systems as claimed in claim 10, wherein monitoring the level of light of the transmitted optical signals comprises:

a photodiode measuring the light output of a laser diode.

* * * * *